July 12, 1949. J. H. PAYNE, JR 2,476,249
REMOTE-CONTROL MANIPULATOR
Filed Nov. 24, 1948 12 Sheets-Sheet 1

INVENTOR.
John H. Payne, Jr.
BY
Roland A. Anderson
Attorney

July 12, 1949.    J. H. PAYNE, JR    2,476,249
REMOTE-CONTROL MANIPULATOR
Filed Nov. 24, 1948    12 Sheets—Sheet 2

INVENTOR.
John H. Payne, Jr.
BY
Roland A. Anderson
Attorney

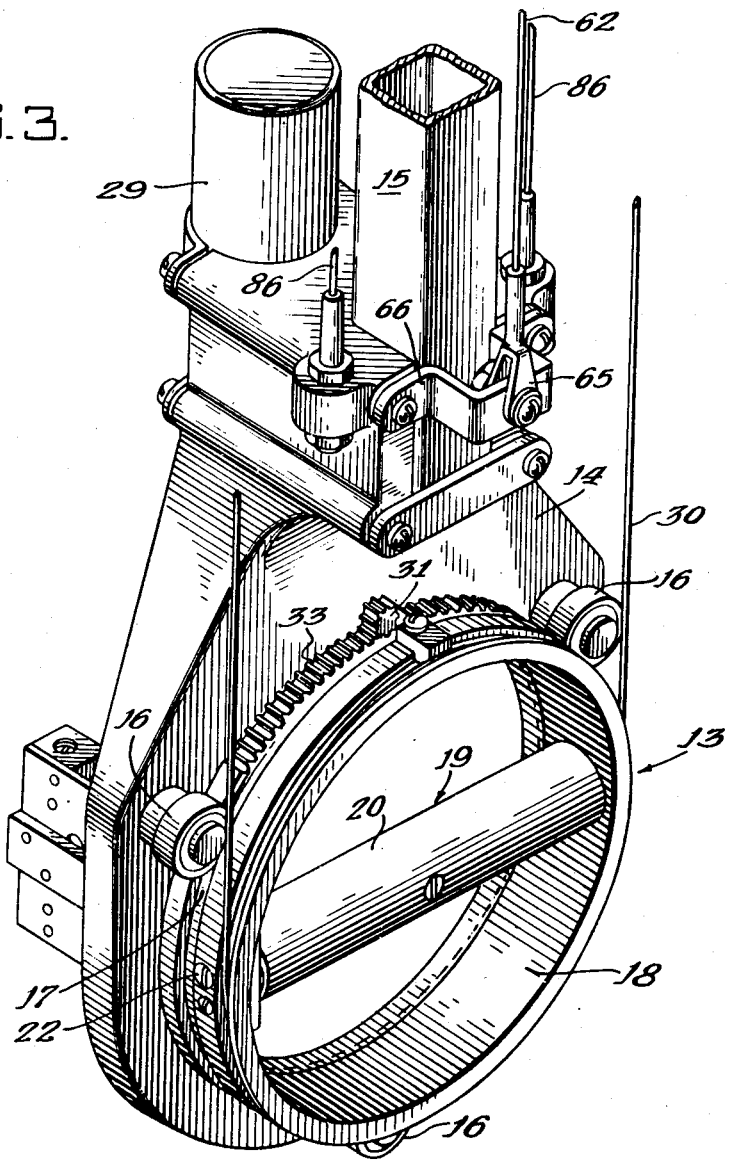

July 12, 1949.   J. H. PAYNE, JR   2,476,249
REMOTE-CONTROL MANIPULATOR
Filed Nov. 24, 1948   12 Sheets-Sheet 4
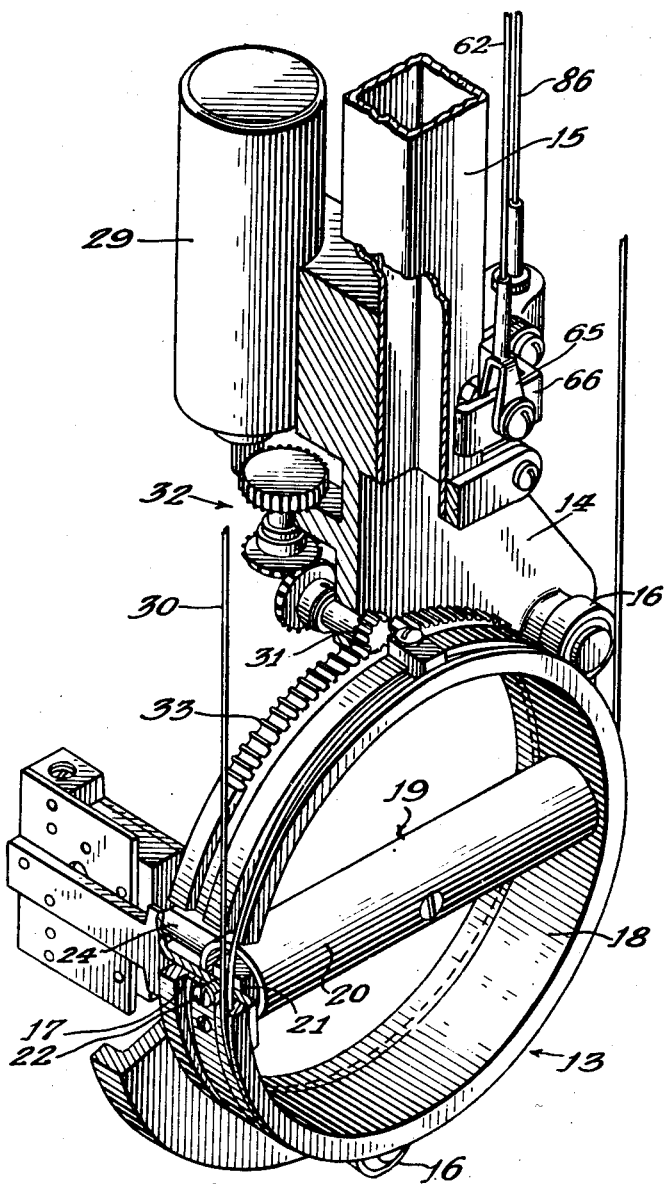
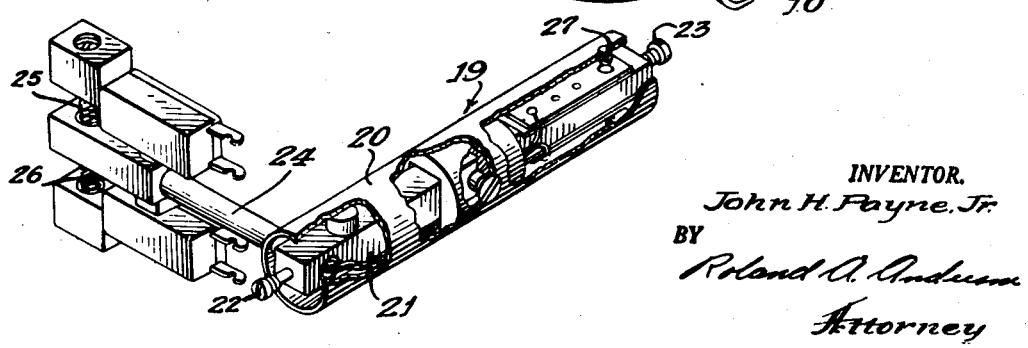
INVENTOR.
John H. Payne, Jr.
BY
Roland A. Anderson
Attorney

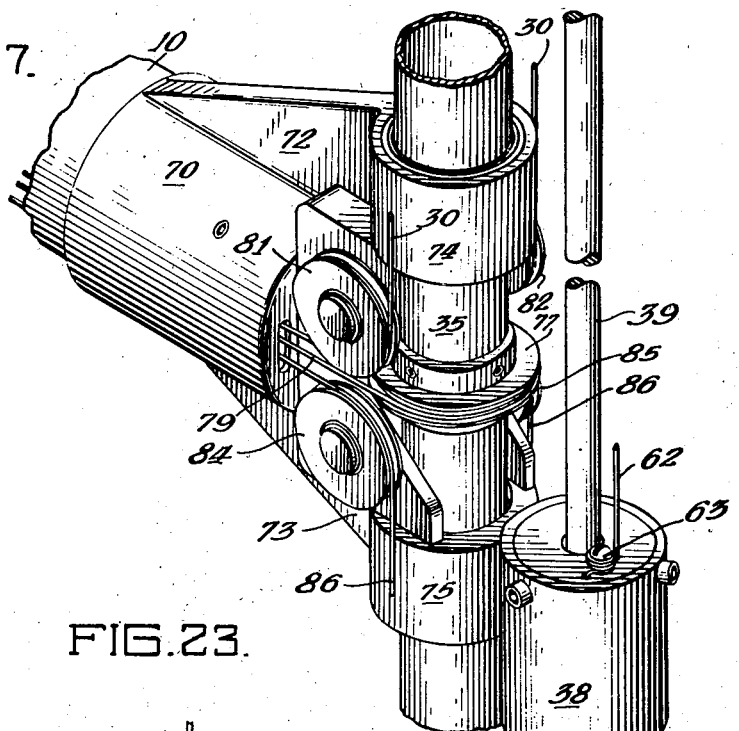
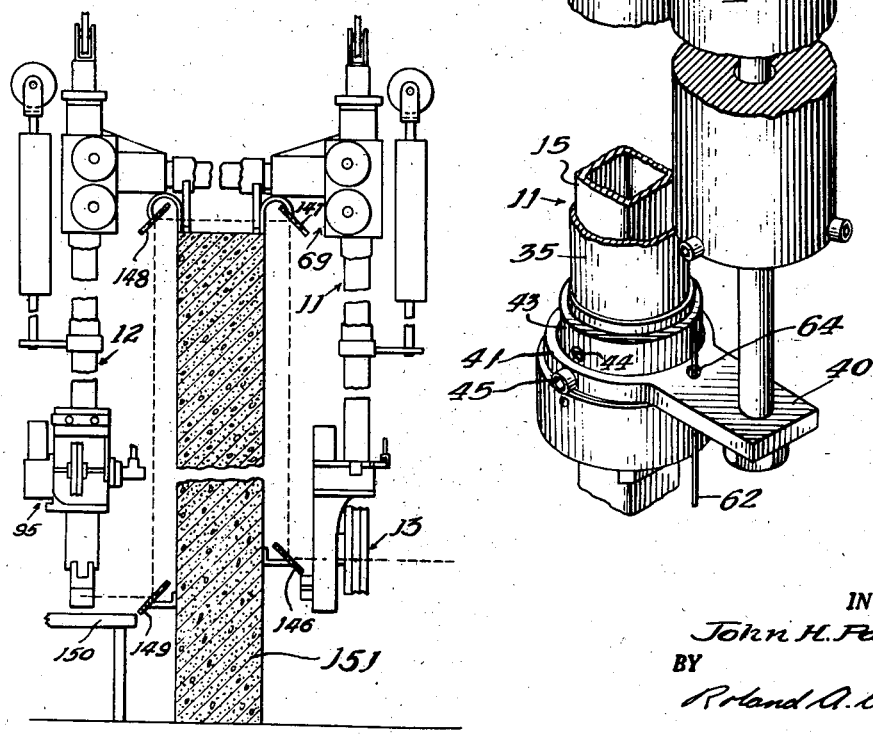

July 12, 1949.　　　　J. H. PAYNE, JR　　　　2,476,249
REMOTE-CONTROL MANIPULATOR

Filed Nov. 24, 1948　　　　　　　　　　　　12 Sheets—Sheet 6

INVENTOR.
John H. Payne, Jr.
BY
Roland A. Anderson
Attorney

July 12, 1949. J. H. PAYNE, JR 2,476,249
REMOTE-CONTROL MANIPULATOR
Filed Nov. 24, 1948  12 Sheets-Sheet 7
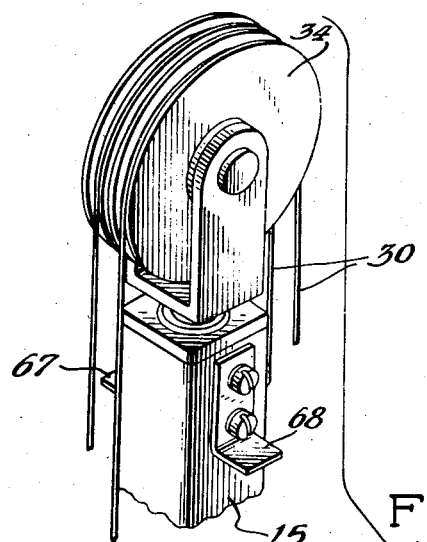
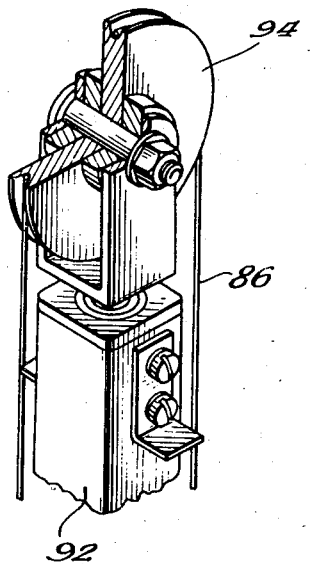
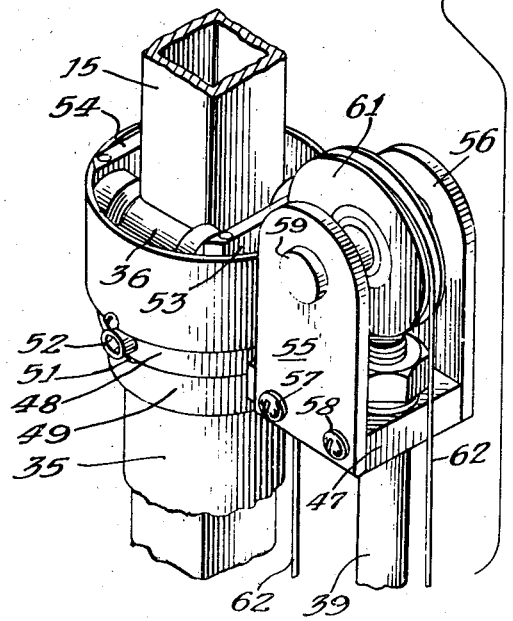
INVENTOR.
John H. Payne, Jr.
BY
Roland G. Anderson
Attorney July 12, 1949. J. H. PAYNE, JR 2,476,249
REMOTE-CONTROL MANIPULATOR
Filed Nov. 24, 1948 12 Sheets-Sheet 8

INVENTOR.
John H. Payne, Jr.
BY
Roland A. Anderson
Attorney

July 12, 1949.　　　　J. H. PAYNE, JR　　　　2,476,249
REMOTE-CONTROL MANIPULATOR
Filed Nov. 24, 1948　　　　　　　　　　　　12 Sheets-Sheet 9
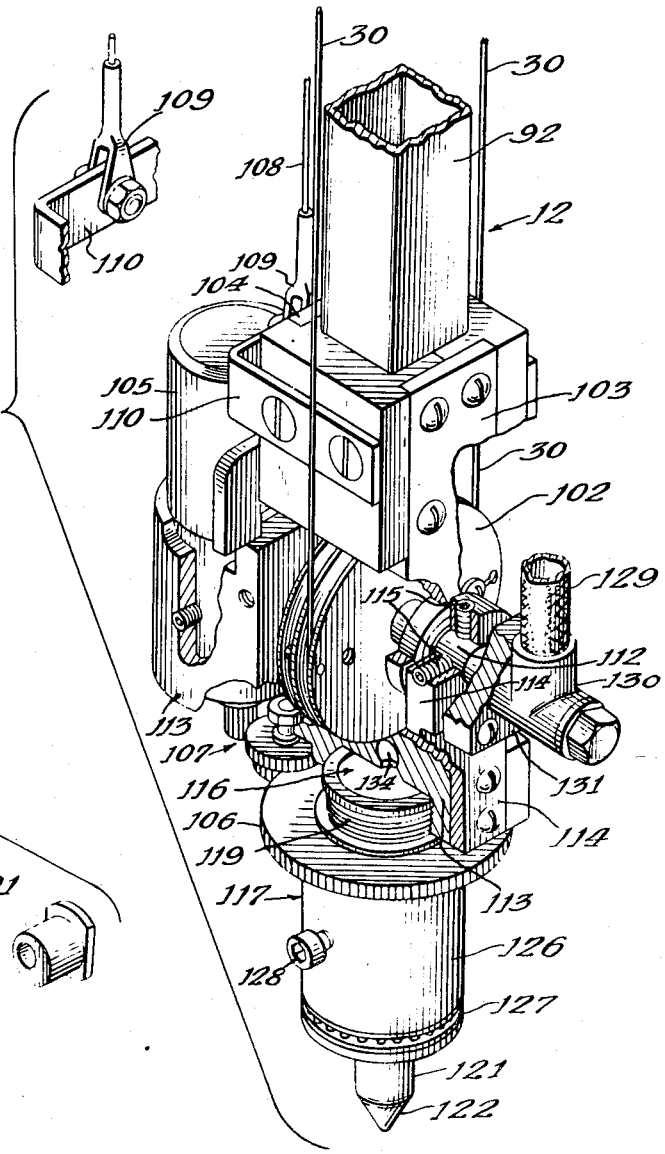
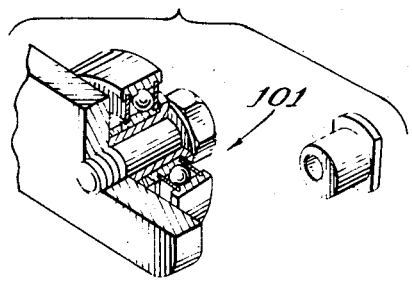
INVENTOR.
John H Payne Jr
BY
Attorney

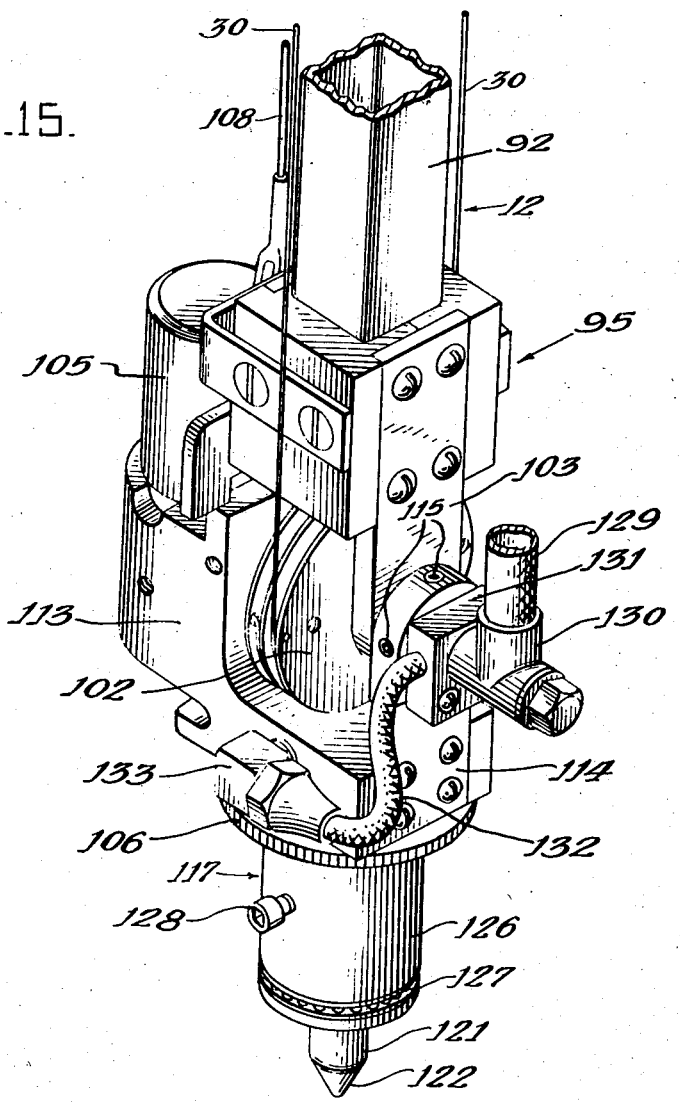

July 12, 1949.  J. H. PAYNE, JR  2,476,249
REMOTE-CONTROL MANIPULATOR
Filed Nov. 24, 1948  12 Sheets—Sheet 11
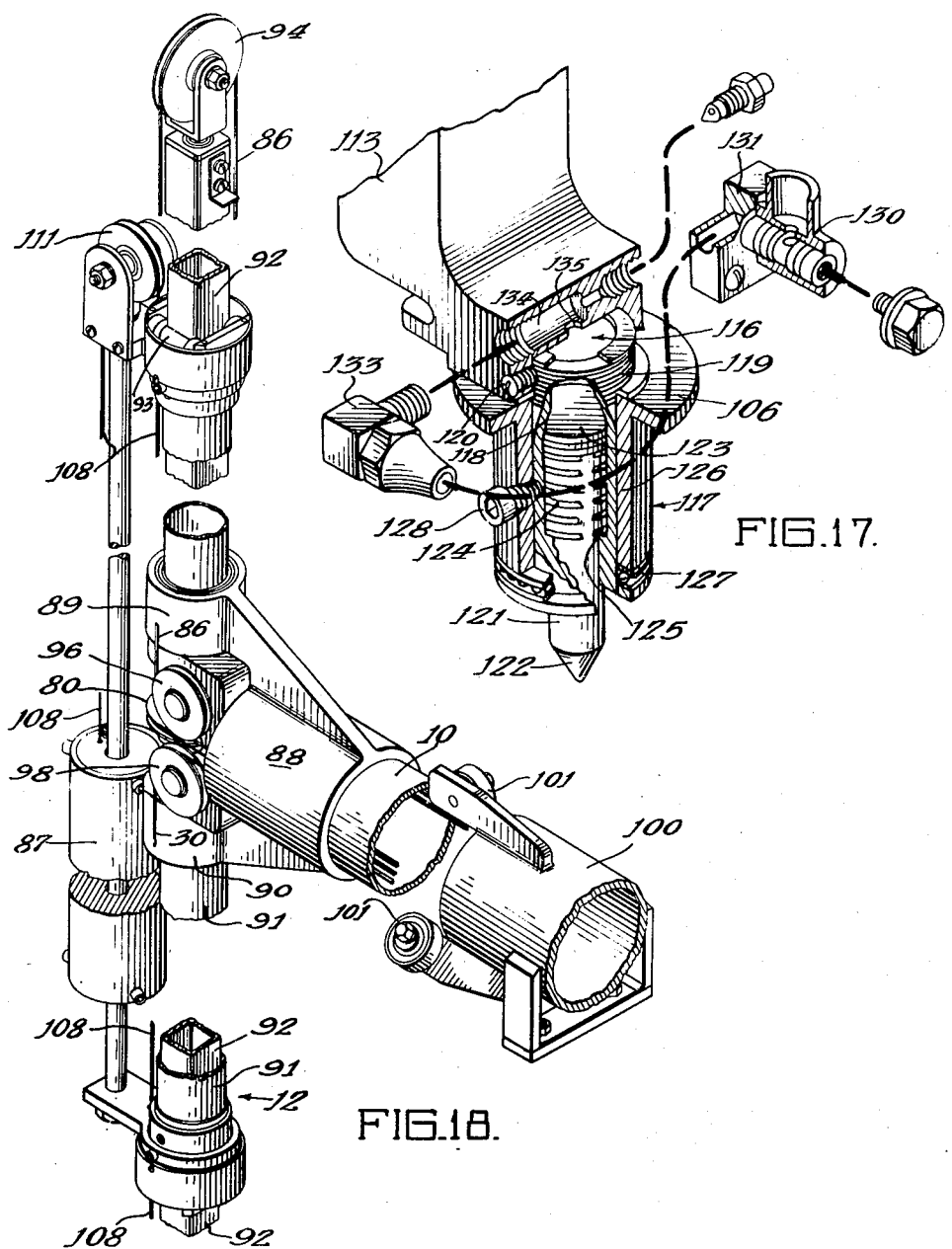
INVENTOR.
John H. Payne Jr.
BY
Roland A. Anderson
Attorney

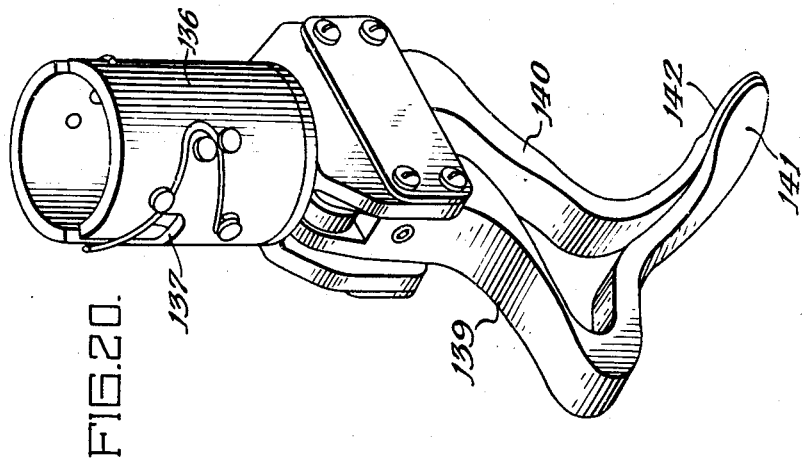
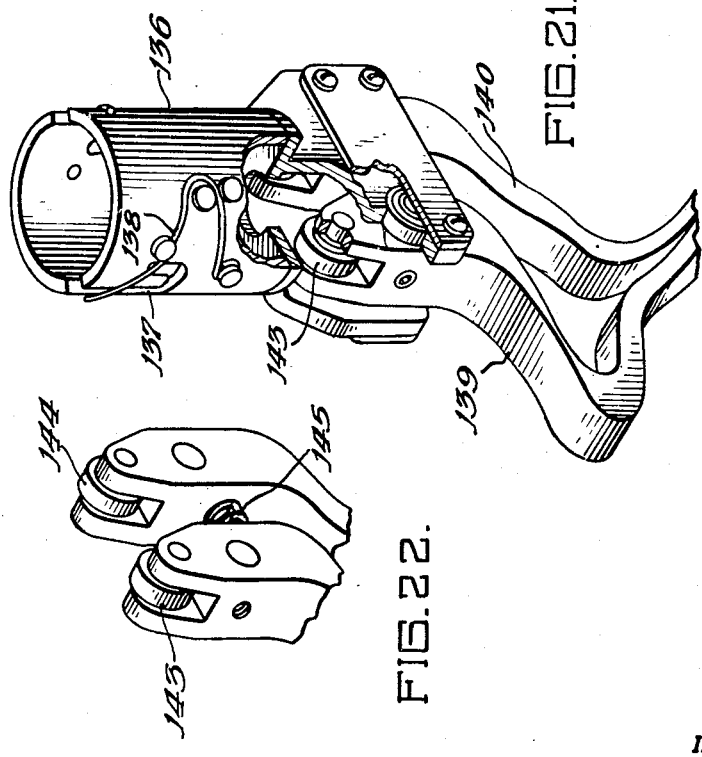

Patented July 12, 1949

2,476,249

UNITED STATES PATENT OFFICE 2,476,249

REMOTE-CONTROL MANIPULATOR

John H. Payne, Jr., Ballston Spa, N. Y., assignor, by mesne assignments, to the United States of America as represented by the United States Atomic Energy Commission Application November 24, 1948, Serial No. 61,837

7 Claims. (Cl. 74—388)

The present invention relates to manipulative devices and in particular it pertains to means for remote control of an artificial hand.

In recent years a need has developed for a remote control manipulator that will enable a person, while located behind a protective wall, to perform certain operations normally done by hand. Such a manipulator is especially important where toxic biological or radioactive materials are involved. Heretofore remote control manipulators have been cumbersome and severely limited in the type of movements of which they were capable. Also, such devices were awkward to use and required considerable practice.

It is an object of this invention to provide a remote control manipulator capable of performing any operation which can be performed by an artificial hand.

It is a further object to provide a manipulator, the movements of which shall correspond as nearly as may be to the movements of the operator's hand so that the operator will instinctively operate the manipulator in the proper manner.

It is a further object of this invention to provide a self-contained remote control manipulator capable of being mounted through or over a protective wall in such a way that it can be moved from point to point along the wall as desired.

It is a further object to locate all the control centers about a single point so that any movement of the point in space will cause a corresponding movement of the artificial hand.

It is a further object of this invention to provide a simple, reliable optical system whereby the operator can observe operation of the artificial hand beyond a protective wall.

It is a further object to provide means whereby the artificial hand or other tool may be removed and replaced by remote control.

The remote control manipulator of the present invention consists essentially of a transverse horizontal tube capable of being mounted over a protective wall. To each end of the tube is attached a vertical arm, one of which carries the artificial hand or tool, and the other carries the manipulating handle. A pair of electric switches are associated with the control handle and serve to operate a pair of reversible electric motors, one of which operates the wrist movement of the artificial hand while the other operates the elbow movement thereof. Suitable cables and counterweights are provided to raise and lower the hand and to rotate it about a vertical axis, as desired.

The invention may be more fully understood by reference to the drawings, wherein, Fig. 1 is an overall perspective view of the manipulator showing certain portions thereof broken away.

Fig. 3 is an enlarged perspective view of the manipulating handle assembly.

Fig. 4 is another view of the manipulating handle assembly with portions thereof broken away to show the gearing connected with the motor for supplying the elbow movement of the artificial hand.

Fig. 5 is a detail view partly in section of the control grip of the manipulating handle.

Fig. 7 is a perspective view, partly in section, of a portion of the front vertical arm above the manipulating handle and showing the connection between the arm and the transverse tube.

Fig. 10 is a view, partly in section, of the top support and pulleys forming part of the front vertical arm.

Fig. 14 is a detail view, partly in section, of one of the rollers shown in Fig. 13.

Fig. 15 is an enlarged perspective view of the elbow and wrist section shown in Fig. 1.

Fig. 16 shows the elbow and wrist section of Fig. 15 with certain portions thereof broken away.

Fig. 17 is a sectional exploded view of a portion of Fig. 16 showing the construction of the hydraulic plunger for closing the artificial hand.

Fig. 18 is a perspective view, partly in section, of the rear vertical arm above the elbow and wrist section.

Fig. 19 is a detail view, partly in section, of the top pulley of the rear vertical arm.

Fig. 20 is a perspective view of an artificial hand suitable for use with the manipulator.

Fig. 21 is a detail view of the hand of Fig. 20 with portions thereof broken away, and Fig. 22 is an enlarged detail view of a portion of the artificial hand shown in Fig. 21.

Fig. 23 is a schematic diagram showing a type of optical system that may be used with a manipulator of the present type.

In the illustrative embodiment of the invention, the manipulator is carried by a transverse horizontal tubular support 10 connected at either end to a pair of vertical arms 11 and 12. The vertical arm 11 carries the operator's manipulating handle and is referred to as the front vertical arm. The arm 12 is intended to be located behind a protective wall, and it is therefore referred to as the rear vertical arm.

Figure 6:
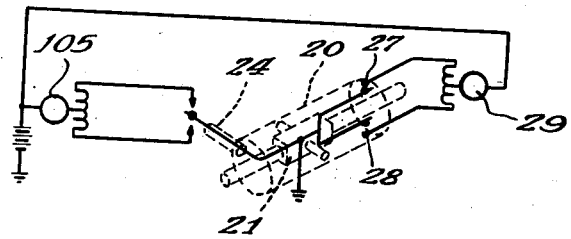
Fig. 6 is a wiring diagram showing the circuits through the control grip.

The manipulating arm assembly 13 is located at the lower portion of the front vertical arm. The assembly, which is shown in Figs. 3 to 5 inclusive, consists of a generally circular metal mount 14 which may be bolted or otherwise secured to a vertical support 15 of square or polygonal cross section. Three supporting rollers 16 are carried by the mount 14 and are arranged to supportingly engage an annular groove 17 of the manipulating ring 18. The ring carries the manipulating handle 19 (Figs. 4 and 5). The handle consists of a cylindrical grip 20 surrounding an internal core 21 (Figs. 5 and 6). Screws 22, 23, at either end of the core, secure the core to the manipulating ring. A contact arm 24, forming part of the grip 20, is maintained normally in a neutral position by operation of springs 25, 26. However, rotation of the grip about its major axis will establish an electric circuit through a reversible direct current motor which powers the wrist motion of the artificial hand. The motor will be driven either forward or in reverse depending upon the direction of rotation of the grip, which, in turn, determines which circuit shall be closed.

Angular movement of the manipulating handle around the Z axis (Fig. 1) controls the operation of the motor which powers the elbow movement of the artificial hand. This is accomplished by making or breaking an electric circuit at either of two points 27, 28, which establish the circuits for driving the motor either forward or in reverse as desired.

The mount 14 also supports the electric motor 29 which powers the elbow movement of the artificial hand by driving a steel cable 30. Motor 29 drives a pinion 31 through a gear train 32 of conventional design. The pinion meshes with a rack 33 forming part of the manipulating ring 18. Cable 30 is wound around the ring and is driven thereby.

Figure 8:
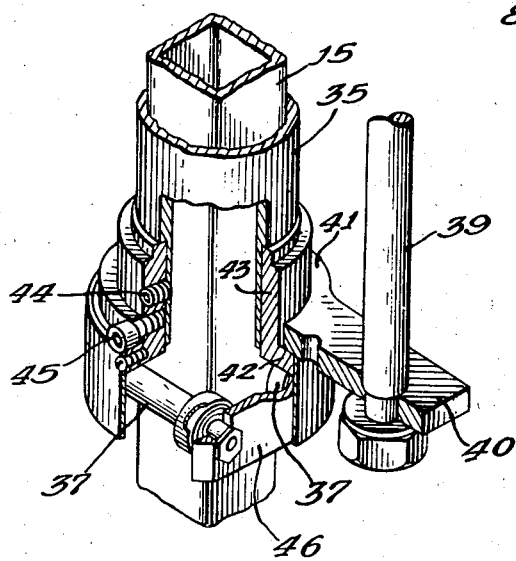
Fig. 8 is an enlarged view, partly in section, of the bottom support and tube guide support shown in Fig. 7.
Figure 11:
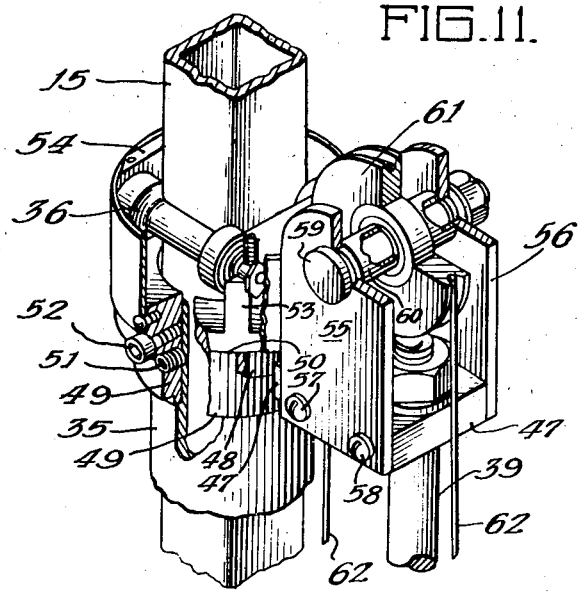
Fig. 11 is a detail view, partly in section, of the top support and tube guide shown in Fig. 10.
Figure 12:
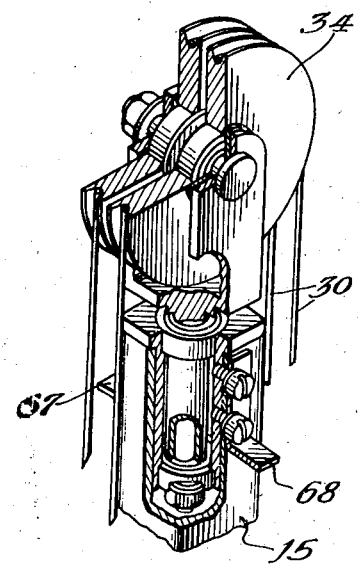
Fig. 12 is a detail view partly in section of the top pulleys shown in Fig. 10.
Figure 13:
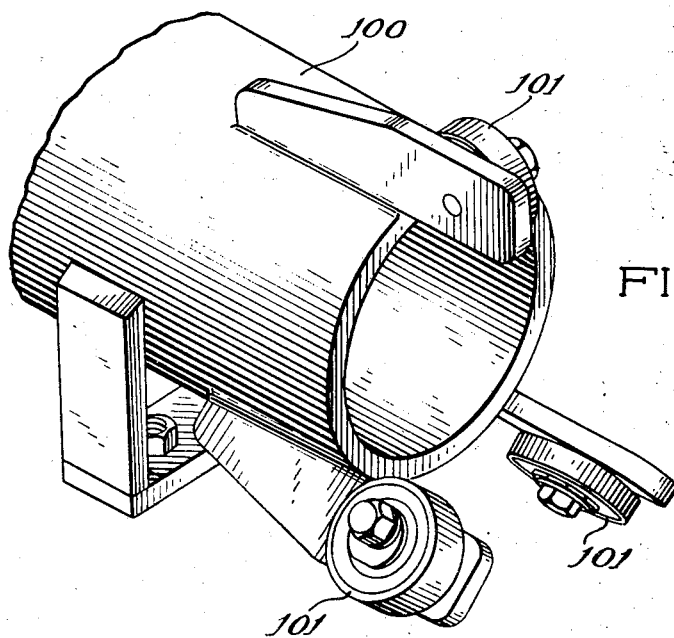
Fig. 13 is a perspective view of a portion of the manipulator mount.

The upper end of the vertical support 15 furnishes a base for a double pulley 34 which may for convenience be referred to as the front top pulley. The support is free to move in a vertical direction through a metal sleeve 35, the latter being provided with two pairs of rollers 36, 37, respectively, located at the top and bottom of the sleeve to facilitate this movement (Figs. 11 and 8). Thus, by moving the manipulating handle vertically, a vertical movement is imparted to the support 15 and the pully 34.

In order to assist the operator in making such vertical movements, a counterweight 38 is included. The latter moves along a counterweight shaft 39; which is carried by the metal sleeve 35. The connection between the lower end of shaft 39 and the sleeve is shown in Fig. 8. In this arrangement the shaft is bolted to an extension 40 on a ring 41 which rests upon a shoulder 42 of an inner ring 43, the latter being fastened to the sleeve by means of a set screw 44. A set screw 45 anchors the outer ring 41 to the sleeve 35.

A pair of parallel beams 46, depending from shoulder 42 provide bearings for the rollers 37.

Figs. 10 and 11 illustrate the connection of the upper portion of the counterweight assembly to the sleeve 35. The upper end of shaft 39 is bolted to an extension 47 of a ring 48. The latter fits over an inner ring 49 and abuts against a shoulder 50 thereof. Set screws 51 and 52 secure the inner and outer rings respectively to sleeve 35.

Parallel beans 53, 54 forming part of the ring 49 provide bearings for the support of rollers 36.

A pair of ears 55, 56 are secured by means of screws 57, 58 to the projection 47 and hold bearings 59 for the trunnions 60 of the counterweight pulley 61.

The counterweight of 38 is operated by a cable 62, one end of which is secured to the counterweight by a screw 63 (Fig. 7). The cable extends over the counterweight pulley 61 (Fig. 10) through an opening 64 (Fig. 7) in the extension 40 and is secured to the manipulating arm assembly through a yoke 65 and a bracket 66 (Fig. 3). In operation, as the manipulating arm assembly is raised, the support 15 moves vertically through its sleeve 35 and the counterweight 38 descends. Alternatively, lowering the manipulating arm assembly causes the counterweight to rise. Downward movement of the assembly is limited by a pair of mechanical stops 67, 68 secured to the upper end of the vertical support 15. These stops, which may be in the form of brackets screwed to the vertical support 15, are arranged to contact the upper edge of the beams 53, 54 to arrest movement of the support 15 (Fig. 10).

Figure 1:
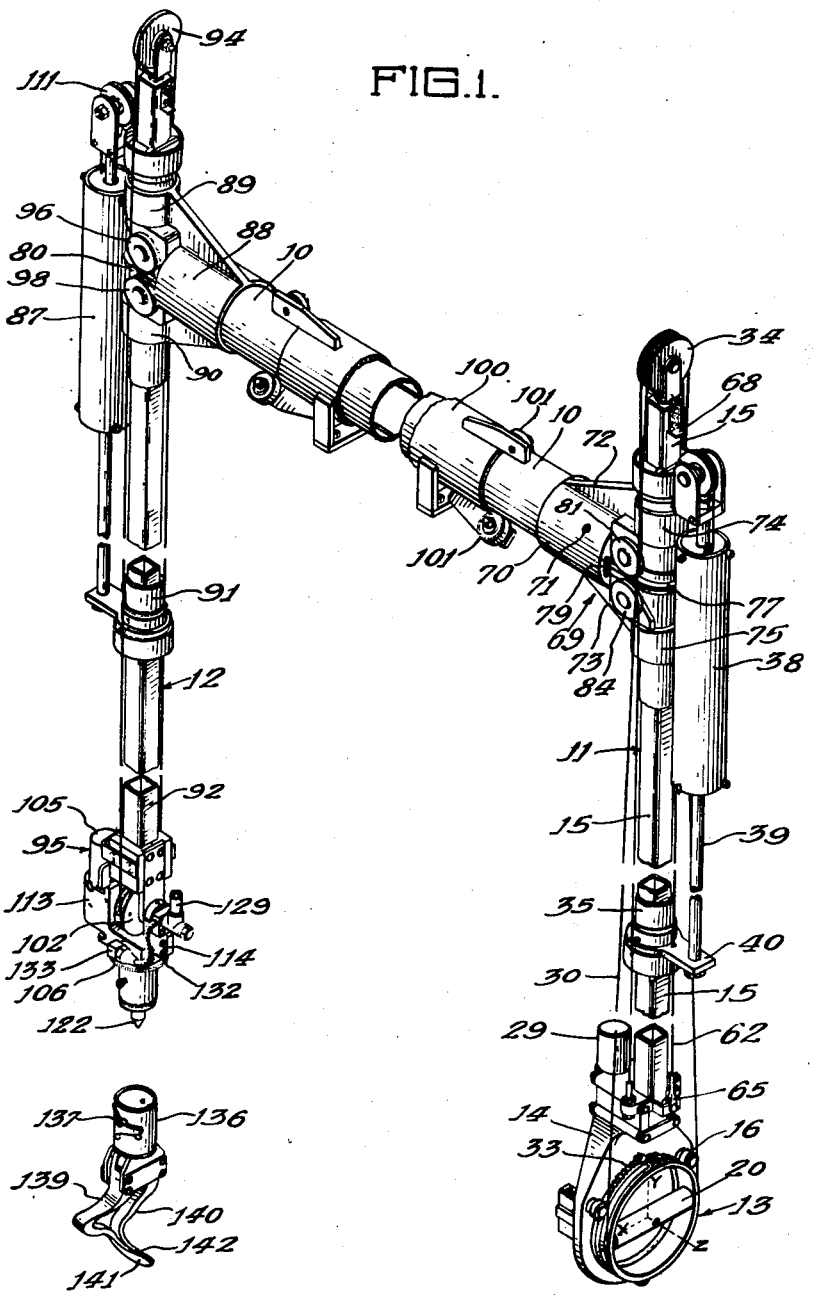
Figure 9:
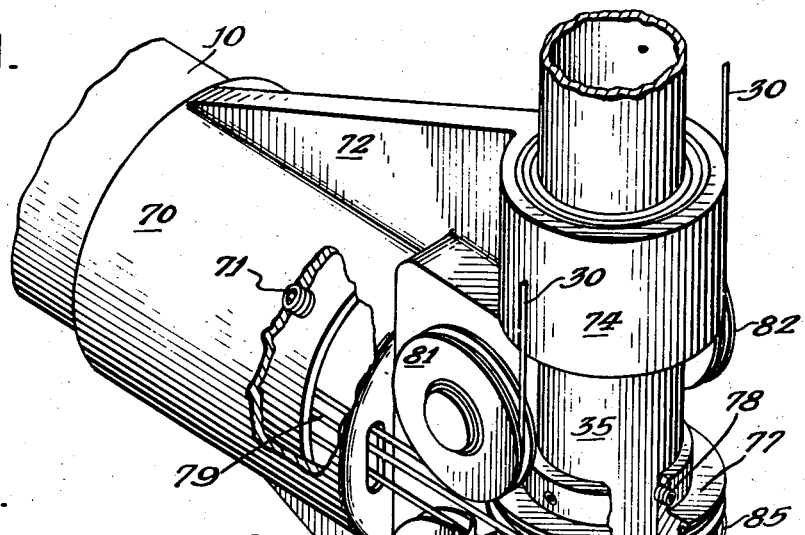
Fig. 9 is a detail view, partly in section, showing the connection between the transverse tube and the front vertical arm shown in Fig. 7.

The entire front vertical arm assembly is carried by the transverse tube 10 through a pulley and sleeve support assembly 69 (Figs. 1 and 9). The assembly consists of a sleeve 70 secured by set screws 71 to the tube 10. Braces 72, 73, formed integral with the sleeve 70, hold an upper ring support 74 and a lower ring support 75 respectively. The sleeve 35 is mounted upon two sets of ball bearings 76, only the lower of which sets is illustrated, in the supporting rings. The arrangement is such that the sleeve is free to rotate about its vertical axis. A horizontally disposed pulley 77 is fastened to the sleeve by set screws 78 so that rotary movements of the manipulating handle, in turning the sleeve around its vertical axis, will simultaneously cause a rotation of the pulley. This movement is transmitted to the rear vertical arm 12 by means of a cable 79. To prevent slippage the cable is wrapped twice around the pulley and its companion pulley 80 on the rear vertical arm.

Four independently mounted pulleys are journaled in the sleeve support assembly and serve to guide the operating cables of the manipulator. The upper left and right pulleys of the front vertical arm are designated respectively 81 and 82 and guide the cable 30 which controls the elbow movement of the artificial hand. The lower left and right pulleys of the front vertical arm, numbered 84 and 85, guide the cable 86 which governs the vertical movement of rear tube 92 (Fig. 18) and of the rear counterweight 87 (Fig. 1) in response to the vertical movements of the manipulating arm assembly.

The construction of the rear vertical arm 12 is generally similar to that of the front vertical arm. As appears in Fig. 18, the rear assembly includes a sleeved section 88 secured to the tube 10 and carrying upper and lower ring supports 89 and 90 provided with ball bearings (not illustrated) for rotatably supporting a vertical metal sleeve 91. A rear support 92 of square cross section is mounted upon upper rollers 93 and lower rollers (not illustrated) for movement in a vertical direction within the sleeve. The upper end of support 92 carries a single pulley 94 for guiding cable 86, whereas the lower end of the support is bolted or otherwise secured to the elbow and wrist assembly 95 for the artificial hand.

Figure 2:
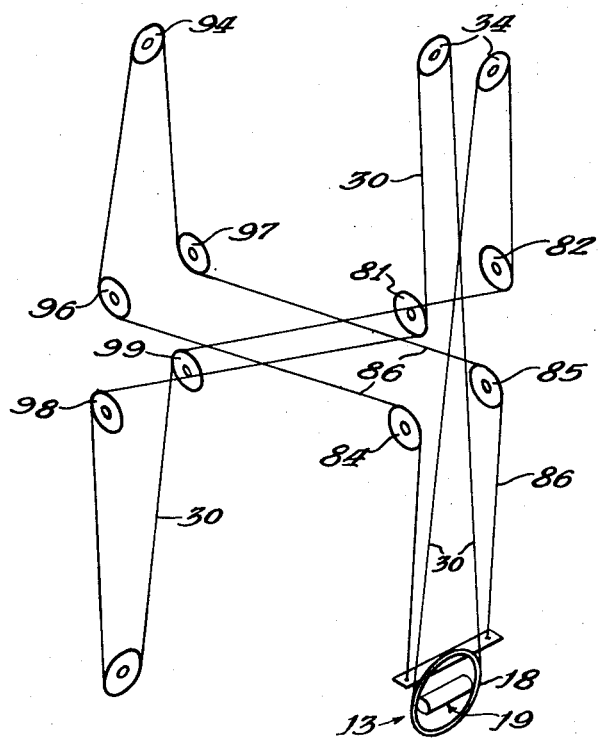
Fig. 2 is a schematic drawing showing the arrangement of the main operating cables.

Four individually mounted pulleys 96, 97, 98 and 99 guide the operating cables. The upper left and right pulleys 96 and 97 guide cable 86, whereas the lower left and right pulleys 98 and 99 accommodate cable 30 (Fig. 2).

The transverse support 10 is situated within a cylindrical member or mount 100 a plurality of rollers 101 being provided to permit the tube 10 to move axially of the mount. The mount may be placed over or through a protective wall or so-called biological shield (not illustrated). Rotation of the tube 10 within its mount 100 is also possible, such movement being effected by manipulation of the assembly 13 in a plane normal to the axis of the tube 10.

The elbow and wrist assembly for the artificial hand is shown in detail in Figs. 15, 16 and 17. It consists of a pulley 102 journaled in a pair of plates 103, 104 screwed or otherwise secured to the vertical arm 92. The pulley is driven by cable 30 and causes the assembly to rotate about the Z axis, thereby simulating the movement of an elbow. Power for driving the cable is provided by the motor 29 as previously described.

A reversible direct current electric motor 105 is mounted on the elbow and wrist assembly and drives a circular gear 106 through a conventional gear train 107. This rotates the artificial hand and simulates the movement of a wrist.

The rear counterweight 87 is operatively connected to the elbow and wrist assembly by a cable 108, attached to the assembly through a yoke 109 and a bracket 110 (Fig. 16). The cable passes over a rear counterweight pulley 111 that is similar in construction and mounting to the front counterweight pulley 61. After passing around the pulley 111, the cable 108 is secured to the rear counterweight in any convenient manner (Fig. 18). The mounting for the rear counterweight is secured to and carried by a rear metal sleeve 91 which is similar in detail to the sleeve 35 upon which the front counterweight and associated parts are mounted.

The wrist and elbow assembly is fastened to the shaft 112 of pulley 102 so that shaft, in rotating, will cause a bending of the assembly with respect to the support 92. This movement simulates the bending of the human elbow. With reference to Figs. 15 and 16, the assembly consists of a block 113 which mounts the motor 105 and extends underneath the pulley 102. This block may be secured to the pulley shaft in any convenient manner, for example, by set screws. That portion of the block which extends beneath the pulley is secured to a plate 114 which in turn is fixed to the shaft 112 by set screws 115. By means of this arrangement, a movement of the pulley 102 in either direction will cause a rotary movement of the entire elbow and wrist assembly around the pulley shaft 112 as an axis.

The lower portion of block 113 has a circular bore 116 which is threaded to receive a plunger assembly generally designated as 117. The assembly consists of a cylinder 118 having threads 119 at its upper end for engaging the threads of the bore 116. The cylinder is held firmly in place by a set screw 120 extending through an opening in a side of the block 113. Within the cylinder is a hydraulically operated piston 121 having a conical lower end 122 and a rubber packing ring 123. One end of a coil spring 124 rests upon a shoulder 125 and the other bears against a recess on the under side of the piston operating surface so that the piston is normally in a retracted position.

Surrounding and coaxial with the cylinder 118 is an outer cylinder 126 having a flanged upper portion, the periphery of which forms the gear 106. The lower portion of cylinder 126 rests upon a ball bearing 127 so that the outer cylinder is free to rotate around the inner cylinder 118. The outer cylinder carries a pair of studs 128 engageable with bayonet slots in an artificial hand or other tool.

The piston or plunger 121 is hydraulically operated. Oil under pressure enters through a flexible conduit or tube 129 that is secured to a T-connection 130. The latter communicates with a block 131 which is itself screwed to the plate 114. As shown in Fig. 15, a flexible conduit 132 connects the block and a fitting 133 which may be screwed into a passage 134 drilled into block 113. The passage communicates with the circular bore 116 by way of an opening 135. Oil under pressure is thereby brought to bear against the piston 121. This forces the piston or plunger downwardly against the spring 124.

While any one of a number of tools may be manipulated by means of the present device an artificial hand has been developed which is especially suitable for use with the manipulator. The hand, which is illustrated in Figs. 20, 21 and 22, consists of cylindrical casing 136 having bayonet slots 137 therein and a spring 138 arranged to hold the studs 128 firmly in place when the hand is attached to the manipulator. A pair of arms 139, 140, terminating in a pair of grasping plates 141, 142, perform the actual manipulations. The upper ends of the arms carry rollers 143, 144 against which the conical point 122 of the piston may be brought to bear to bring the grasping plates together. Each of the arms is pivoted adjacent its upper end, and a coil spring 145 maintains the rollers normally together and the grasping plates normally apart. However by application of hydraulic pressure, the piston 121 is caused to descend. This forces the rollers apart. The arms pivot, and the grasping surfaces are brought together. By controlling the degree of pressure and therefore the position of the plunger, the hands may be closed by any desired amount. Any suitable means for controlling the hydraulic pressure, such as a foot pedal, may be employed for this purpose.

In order to observe the operation of the artificial hand, a simple optical system may be arranged as shown in Fig. 23. The system there illustrated comprises four mirrors 146, 147, 148, and 149. These transmit the image of work on the table 150 to the operator on the opposite side of a protective wall 151. In actual practice two manipulating devices embodying the present invention are employed, one for each of the operator's hands. Thus two artificial hands may be made to cooperate in a manner similar to human hands.

In operation, the entire manipulating device may be mounted on tracks arranged so that it may be moved along the protective wall to any desired point. This effects translation along the X axis (Fig. 1). To a limited extent this is accomplished by rotation of 10 in sleeve 100.

Translation along the Y axis is accomplished by raising or lowering the manipulating arm assembly. As the assembly is raised, the front counterweight 38 descends. At the same time, the rear vertical support 92 and its pulley 94 rises, thereby raising the elbow and wrist assembly 95 by a like amount. This is aided by action of the rear counterweight 87 and cable 86 (Fig. 2). As the manipulating arm assembly is raised, cable 86, passing around pulleys 84, 85, 96 and 97, permits the pulley 94 to rise aided by the force exerted by the rear counterweight and by cable 30.

Translation along the Z axis is achieved by sliding the tube 10 axially through the mount 100.

Rotation of the manipulating handle 19 about the X axis will close a circuit through the reversible direct current motor 105 (Fig. 6). The motor will drive the gear 106 and will cause the hand to turn in a manner simulating the action of the human wrist.

Rotation of the manipulating handle 19 around the Y axis will rotate the vertical support 15 and sleeve 35 along with the pulley 77 attached thereto. Cable 79 will transmit this motion to the artificial hand by means of pulley 80, sleeve 91, and the rear vertical support 92.

Rotation of the manipulating handle around the Z axis will close a circuit through the reversible direct current motor 29. This will drive the pinion 31 and rotate the manipulating ring 18 through the rack 33. This movement is transmitted to the artificial hand by cable 30. Starting at the left side of the ring 18 this cable passes over one side of pulley 34 (Fig. 2) and then around pulleys 82 and 99 to pulley 102. Thereafter the cable returns by way of pulleys 98, 81, and 34 to the ring 18. Movement of the pulley 102, in response to movement of the cable, causes the entire wrist and elbow assembly to bend with respect to the vertical support 92, thereby simulating the action of the human elbow. To prevent slipping of the cable, it may be wrapped one and one half times around the ring 18 and the pulley 102, and the ends may be fastened to the latter pulley. To a degree, rotation around the Z axis may be secured by rotation of the tube 10 by movement of the manipulating arm assembly in a plane perpendicular to the axis of the tube 10.

When the artificial hand has been positioned, it is closed by admitting oil into the plunger assembly, thereby causing the piston to descend and force the grasping surfaces of the artificial hand together. While any suitable means for controlling the oil pressure may be used, a foot pedal has been found most convenient since the operator's hands are fully occupied.

From the foregoing description, it is evident that both rotation and translation of the artificial hand about the X, Y, and Z axes are centered around a single point located centrally of the manipulating handle 19. Further, it will be noted that the artificial hand will follow the movements of the handle so that the operator will instinctively make the correct movement. This reduces the time required for training the operator and reduces the danger of improper manipulation of the hand. The importance of this consideration is apparent when one considers the toxic nature of the materials which the device was designed to handle.

With the present manipulator, it is possible, from behind a protective wall, to change the hand. A large one can be used for heavy jobs. If the task requires a more delicate touch, the hand can be lowered into a holder and removed. Then the arm may be moved to pick up and attach a smaller hand. If desired the hand may be provided with a pair of snips instead of grasping surfaces so that objects such as sheet metal may be cut.

By this device an operator, seated safely behind a protective wall, can quickly and easily perform a variety of complicated operations, such as striking a match, operating a brace and bit, removing a stopper from a bottle, pouring liquids from one container into another, and many other movements.

1. A manipulating device including a transverse tube, a first support movably mounted in a first vertical sleeve dependent from an end of said tube, a manipulating handle mount secured to said support, a manipulating handle carried by said mount, a second support movably mounted in a second vertical sleeve dependent from the remaining end of said tube, an assembly connectable with an artificial hand secured to said second support, a first motor controlled by rotation of the manipulating handle around its axis, a gear train driven by said motor and operable to rotate said assembly, a second motor controlled by rotation of said handle about an axis normal to the axis thereof, and a cable driven by said second motor and connected to cause an angular movement of said assembly with respect to said second support.

2. A manipulating device including a transverse tube, a first support movably mounted in a first vertical sleeve dependent from an end of said tube, a manipulating handle mount secured to said support, a manipulating handle carried by said mount, a second support movably mounted in a second vertical sleeve dependent from the remaining end of said tube, an assembly connectable with an artificial hand secured to said second support, a first motor controlled by rotation of the manipulating handle around its axis, a gear train driven by said motor and operable to rotate said assembly, a second motor controlled by rotation of said handle about an axis normal to the axis thereof, a first cable driven by said second motor and connected to cause an angular movement of said assembly with respect to said second support, a first counterweight mounted on the first sleeve and operably connected with said mount, a second counterweight mounted on said second sleeve, and a second cable interconnecting said mount and said second support, said second cable cooperating with said second counterweight to vertically position the second support in response to vertical movements of the mount.

3. A manipulating device including a transverse tube, a first support movably mounted in a first vertical sleeve dependent from an end of said tube, a manipulating handle mount secured to said support, a manipulating handle carried by said mount, a second support movably mounted in a second vertical sleeve dependent from the remaining end of said tube, an assembly connectable with an artificial hand secured to said second support, a first motor controlled by rotation of the manipulating handle around its axis, a gear train driven by said motor and operable to rotate said assembly, a second motor controlled by rotation of said handle about an axis normal to the axis thereof, a first cable driven by said second motor and connected to cause an angular movement of said assembly with respect to said second support, pulleys fixed to said first and second sleeves, and a second cable interconnecting said pulleys whereby rotation of said first sleeve about its axis is transmitted to said second sleeve.

4. A manipulating device comprising a transverse cylindrical mounting member, rollers carried by said member, a transverse tube supported within the member and movable axially thereof on said rollers, a first support movably mounted in a first sleeve dependent from an end of said tube, a manipulating handle mount secured to said support, a manipulating handle carried by said mount, a second support movably mounted in a second sleeve dependent from the remaining end of said tube, an assembly connectable with an artificial hand secured to said second support, a first motor controlled by rotation of the manipulating handle around its axis, a gear train driven by said motor and operable to rotate said assembly, a second motor controlled by rotation of said handle about an axis normal to the axis thereof, and a cable driven by said second motor and connected to cause an angular movement of said assembly with respect to said second support.

5. A manipulating device comprising a transverse cylindrical mounting member, rollers carried by said member, a transverse tube supported within the member and movable axially thereof on said rollers, a first support movably mounted in a first vertical sleeve dependent from an end of said tube, a manipulating handle mount secured to said support, a manipulating handle carried by said mount, a second support movably mounted in a second vertical sleeve dependent from the remaining end of said tube, an assembly connectable with an artificial hand secured to said second support, a first motor controlled by rotation of the manipulating handle around its axis, a gear train driven by said motor and operable to rotate said assembly, a second motor controlled by rotation of said handle around an axis normal to the axis thereof, a first cable driven by said second motor and connected to cause an angular movement of said assembly with respect to said second support, a first counterweight mounted on the first sleeve and operably connected with said mount, a second counterweight mounted on said second sleeve, and a second cable interconnecting said mount and said second support, said second cable cooperating with said second counterweight to vertically position the second support in response to vertical movements of the mount.

6. A manipulating device comprising a transverse cylindrical mounting member, rollers carried by said member, a transverse tube supported within the member and movable axially thereof on said rollers, a first support movably mounted in a first vertical sleeve dependent from an end of said tube, a manipulating handle mount secured to said support, a manipulating handle carried by said mount, a second support movably mounted in a second vertical sleeve dependent from the remaining end of said tube, an assembly connectable with an artificial hand secured to said second support, a first motor controlled by rotation of the manipulating handle around its axis, a gear train driven by said motor and operable to rotate said assembly, a second motor controlled by rotation of said handle around an axis normal to the axis thereof, a first cable driven by said second motor and connected to cause an angular movement of said assembly with respect to said second support pulleys fixed to said first and second sleeves, and a second cable interconnecting said pulleys whereby rotation of said first sleeve about its axis is transmitted to said second sleeve.

7. A manipulating device comprising a transverse cylindrical mounting member, rollers carried by said member, a transverse tube supported within the member and movable axially thereof on said rollers, a first support movably mounted in a first vertical sleeve dependent from an end of said tube, a manipulating handle mount secured to said support, a manipulating handle carried by said mount, a second support movably mounted in a second vertical sleeve dependent from the remaining end of said tube, an assembly connectable with an artifical hand secured to said second support, a first motor controlled by rotation of the manipulating handle around its axis, a gear train driven by said motor and operable to rotate said assembly, a second motor controlled by rotation of said handle around an axis normal to the axis thereof, a first cable driven by said second motor and connected to cause an angular movement of said assembly with respect to said second support, a first counterweight mounted on the first sleeve and operably connected with said mount, a second counterweight mounted on said second sleeve, a second cable interconnecting said mount and said second support, said second cable cooperating with said second counterweight to vertically position the second support in response to vertical movements of the mount, pulleys fixed to said first and second sleeves and a third cable interconnecting said pulleys whereby rotation of said first sleeve about its axis is transmitted to said second sleeve.

JOHN H. PAYNE, Jr.

No references cited.